HOUSING AND ADJUSTMENTS FOR AN ELECTRICAL STANDARD NETWORK

Filed Sept. 24, 1964

9 Sheets-Sheet 1

INVENTOR
H. A. SAUER
BY E. J. Olinder
ATTORNEY

April 11, 1967 H. A. SAUER 3,314,003

HOUSING AND ADJUSTMENTS FOR AN ELECTRICAL STANDARD NETWORK

Filed Sept. 24, 1964 9 Sheets-Sheet 3

April 11, 1967 H. A. SAUER 3,314,003

HOUSING AND ADJUSTMENTS FOR AN ELECTRICAL STANDARD NETWORK

Filed Sept. 24, 1964 9 Sheets-Sheet 5

April 11, 1967 H. A. SAUER 3,314,003

HOUSING AND ADJUSTMENTS FOR AN ELECTRICAL STANDARD NETWORK

Filed Sept. 24, 1964 9 Sheets-Sheet 6

HOUSING AND ADJUSTMENTS FOR AN ELECTRICAL STANDARD NETWORK

Filed Sept. 24, 1964

3,314,003
HOUSING AND ADJUSTMENTS FOR AN ELECTRICAL STANDARD NETWORK

Harold A. Sauer, Hatboro, Pa., assignor to Bell Telephone Laboratories, Incorporated, New York, N.Y., a corporation of New York Filed Sept. 24, 1964, Ser. No. 398,908
11 Claims. (Cl. 323—75)

This invention relates to apparatus for calibrating D.-C. resistance and conductance bridges. More specifically, it pertains to apparatus for housing and manipulating the calibration network.

In recent years, uses for materials of very high resistivity have expanded, bringing a concomitant need for highly accurate and precise measuring bridges and for resistance standards to calibrate these bridges. The usual method of calibrating has been to connect a standard having a component, or several series-connected components, of known certified resistance value, and compare this value with the bridge scale readout. Such a method has been satisfactory in the past for calibrating bridges in a range up to about $10^7$ ohms. Individual components with resistances of this order of magnitude can be measured precisely and calibrated by well-known methods employed at the National Bureau of Standards, for example. At this time the Bureau of Standards will calibrate the resistance values of individual resistors with the values extending to the multimegohm range. However, individual resistors of convenient size higher than about $10^{10}$ ohms are unstable and therefore unreliable as components in a standard.

To calibrate resistance bridges having these higher upper ranges, it is of course possible to construct a standard using a great multitude of series-connected resistors having known lower values. The higher the upper range, however, the more impracticable this method becomes; and at ranges of $10^{14}$ through $10^{16}$ ohms the method is unworkable.

A viable alternative exists, however, in the employment as a standard of a known Y network having only three resistors which operates as a resistance multiplier. The principle of this network is stated, for example, in an article "The Equivalence of Triangles and Three-Pointed Stars in Conducting Networks," A. E. Kennelly, Electrical World, New York, New York, volume 34, 1899, pp. 413–414. The manner in which such a Y network may be connected to a resistance bridge, for example, is shown in "A D.-C. Wheatsone Bridge for Multiterohm Measurements With High Accuracy Capability," by H. A. Sauer and W. H. Shirk, Jr., Communication and Electronics, March 1964. As shown therein, the Y network is connected to the bridge through its *a*, *c* and *d* terminals. The network functions in such a manner that with properly chosen relatively low resistances, it will provide in its delta transformation a simulated resistance across the $X_1$–$X_2$ bridge terminals that is orders of magnitude higher than any one resistance component of the network.

The primary and working standards that embody this network principle must be adaptable on a broad basis to a system of interest and benefit to precision electrical groups and organizations, with an objective of the eventual establishment of very high resistance standards and their calibration by the National Bureau of Standards.

The achievement of this purpose involves several special problems concerning the Y network and its housing, the solutions to which constitute the subject of this invention. For example, since the value of the resistance in the equivalent delta network branch bears an exact mathematical relationship to the respective values of the three Y network resistors, it is essential that these latter values not only be known precisely when the network is assembled, but that they remain constant throughout the life of the standard. When resistors in the multimegohm region are used for precision applications, such as, for example, in the Y network cited, the resistivity of any insulation which supports or otherwise isolates these resistors becomes itself quite critical. Even the best organic insulators are known to age or change in their resistivity characteristics in response to ambient conditions such as temperature, dust and humidity. The propensity of insulation resistivity to change coupled with the tendency of at least some current to leak through any insulator eventually makes a precision network using solid insulation unreliable as a highly accurate standard.

Moreover, such a network to be reliable as a calibration standard must be shielded from electrostatic disturbance and from conditions of dirt, moisture, et cetera, which as noted, tend to vary the resistance of the component and promote parallel leakage. At the same time, however, the network must be readily employable and securely housed for protection during use and storage as well as for safe transportaiton to a calibrating center such as the Bureau of Standards.

Finally, for reasons of protection cited and for efficiency of operation, it is necessary that each single resistance can be calibrated without having to remove the resistor from the network or to remove the network from its housing.

Accordingly, an object of this invention is to eliminate completely the problems of parallel leakage and resistivity changes in a resistance network.

Another object of the invention is to house conveniently and protectively a precision resistance network.

A further object of the invention is to simplify the storing and transporting of such a network.

A further object of the invention is to simplify the calibration of the entire network and of the individual resistors in the network, without having to remove or otherwise disturb the resistors.

A further object of the invention is to eliminate electrostatic charge build-up on the individual resistors of the network when in storage.

These and other objects are achieved through the inventive principle by an assembly of insulation-free resistors attached in a Y network that is connected through leads to the appropriate terminals of a bridge as described earlier, which assembly is permanently contained within a shielding device that includes means adjustable from without for supporting the assembly within the device, for isolating completely the entire assembly from the device so that the only insulator is air and for isolating each individual resistor for recalibration by measurements across the leads.

In one embodiment of the invention herein described, the Y network is supported in its housing by two terminals and two associated metal disks. The terminals lead out from a protective housing through connectors and plug into a bridge or test equipment. In accordance with one feature of the invention, when not in use as a standard, the network is held rigidly in a fixed place within the housing by several support pins and anchor pins which impinge upon the terminals and the disks. The assembly is employed as a standard by plugging the connectors into corresponding connectors on the bridge and withdrawing the support and anchor pins. The network thereby is supported by the bridge connectors in exactly the position it occupies when held by the support and anchor pins. There is no mechanical, electrical or insulation connection whatsoever between the network assembly and the protective housing, except for the air within the housing. After the bridge is calibrated, the pins are replaced, and the housing and network assembly are removed from the bridge.

In another embodiment of the invention each of the resistors of the Y network is supported by a pair of jaws adjustable from outside the housing by a thumb screw. The jaws grasp a connector on one end of which the resistor is mounted and on the other end of which there is a female connector for mating with corresponding male connectors on the mating bridge. When in storage, the network is held in place within the housing by the action of the three jaw pairs. The assembly is employed as a standard by plugging the connector into the bridge terminals and by backing down on the thumb screws to open the jaws away from the connector. This alternate embodiment also enables the network to be supported by the bridge connectors in the position it occupies when held by the jaw pairs.

In accordance with another feature of the invention, each resistor in the network may be shorted out by means including a housing-mounted shorting screw, so that no electrostatic charge build-up on the component resistors which could alter the network's characteristics may occur.

In accordance with a further feature of the invention, each of the Y network resistances in turn may be recalibrated on a primary standard bridge by employing simple adaptors and by properly manipulating the shorting screw and support and anchor pins, as will be described later. The resistances need not be removed from the circuit nor need the network even be exposed because the measurements are taken across the standard connectors with the protective housing in place.

Accordingly, a feature of the invention relates to a network that is supported within a protective housing or completely isolated within the housing from all but the outside connecting terminals by simple manual adjustments made from without.

Another feature of the invention resides in the employment of these outside adjustments to isolate each individual resistor so that it can be calibrated by itself without disturbing the network or removing the resistor from its housing.

These and other objects and features of the invention will be made more apparent by the detailed description of an illustrative embodiment to follow, and by referring to the drawing in which.

*Structure*

Figure 1:
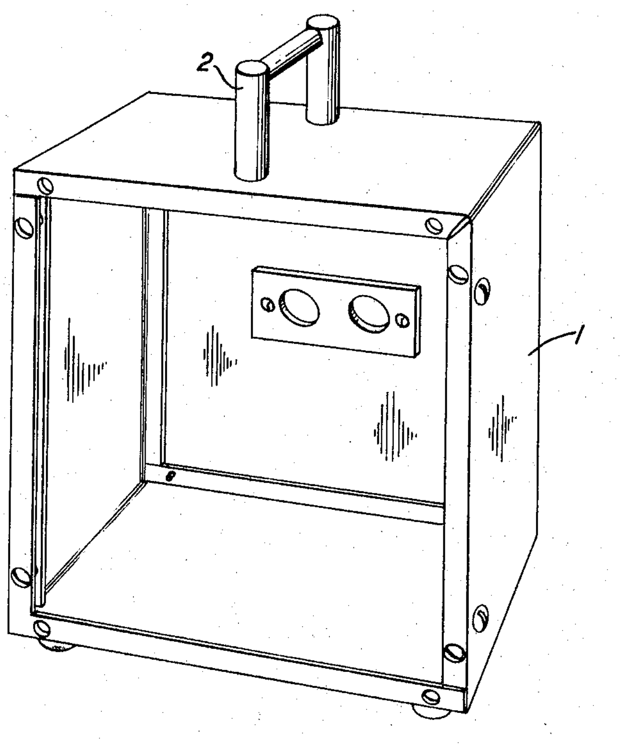
FIG. 1 is a perspective view of the carrying case.
Figure 2:
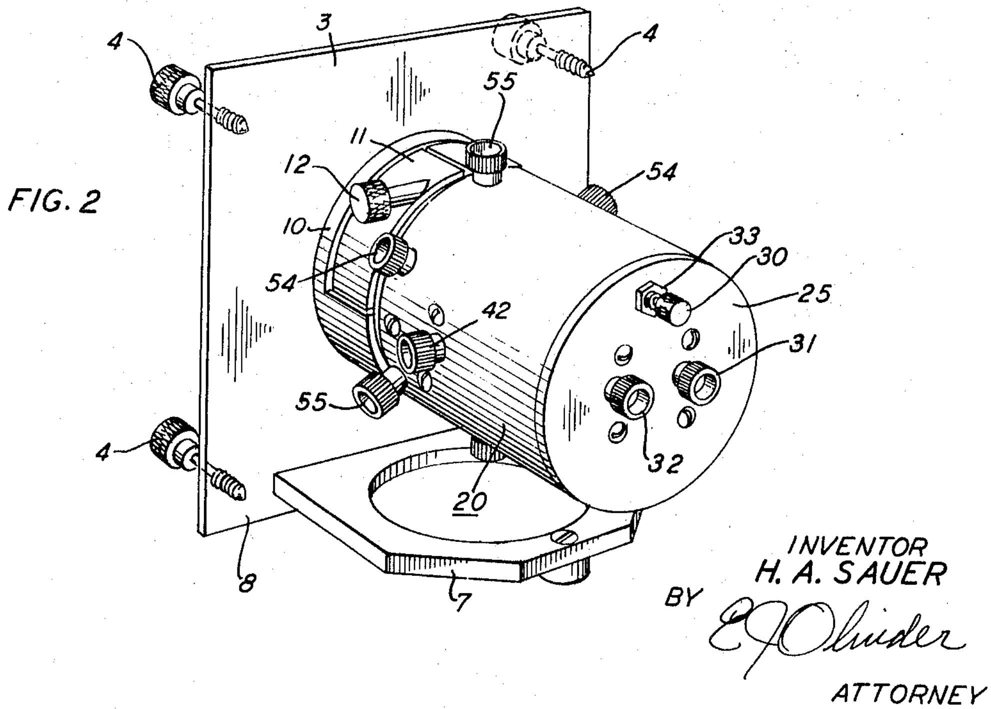
FIG. 2 shows in perspective the mounting plate with the complete standard in place.

Referring first to FIG. 1, a storage case 1 with a handle 2 is shown, in which the standard may be stored when not in use or when being transported. In FIG. 2, a mounting plate 3 on which is fastened a mounting ring 10 secures to case 1 with several thumbscrews 4. Ring 10 includes clamping sleeve 11 and clamp screw 12 which grasp a collar support 50 shown in FIG. 3, so that the standard is held securely within the case. Plate 3 includes a foot 7, mounted at right angles to a lower edge 8, to support plate 3 in an upright position. Within mounting ring 10 are secured two hermaphroditic connectors (best seen in FIG. 3) on which are mounted the connectors of the standard, to be described later. Plate 3 is also the assembly jig for the standard. Shown also in FIG. 2 is housing 20 with an end plate 25 screwed thereto, and the outside portion of anchor pins 31, 32, 42, the support pins 54, 55 and shorting screw 30, the functions of which will be described later.

Figure 3:
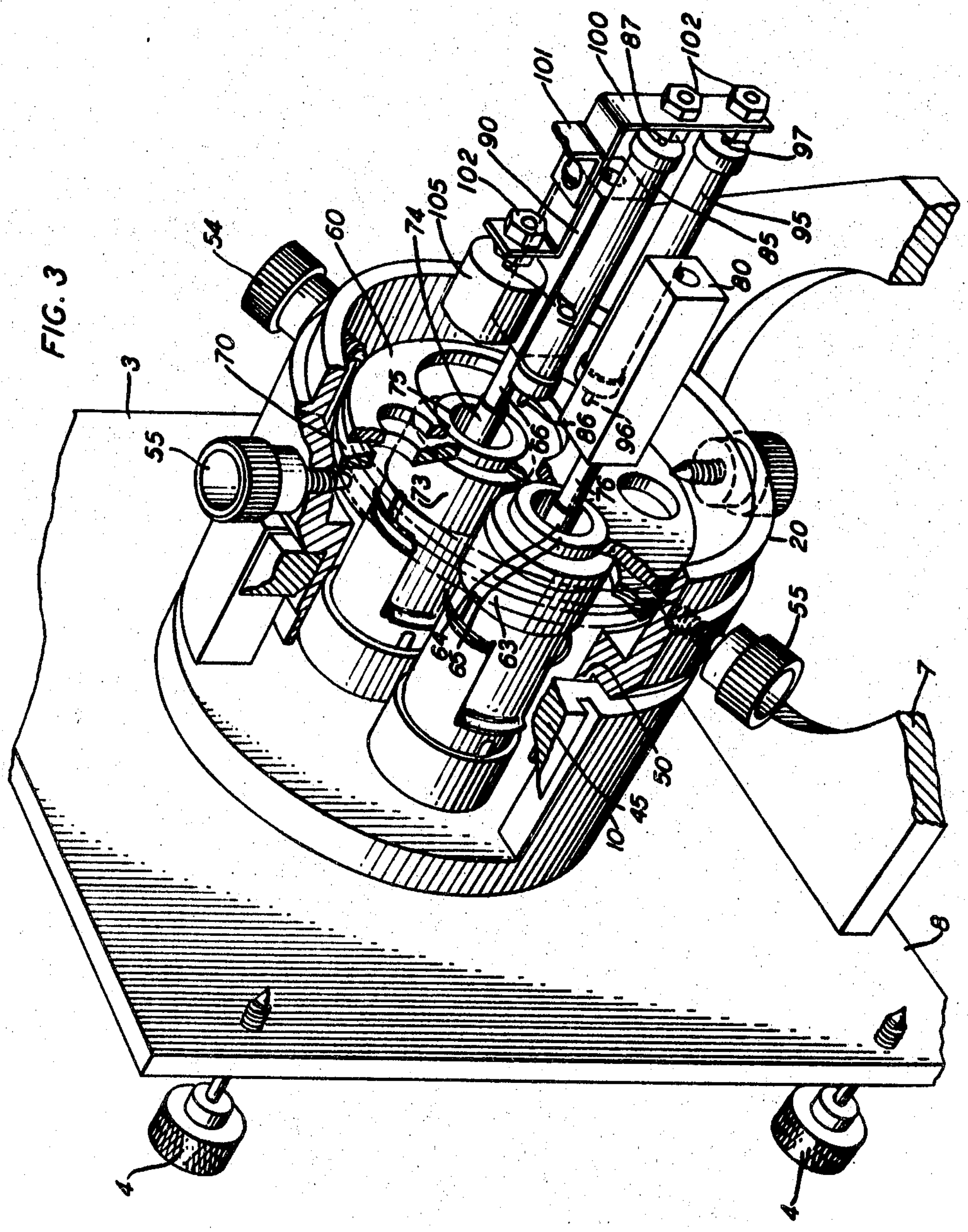
FIG. 3 is a partial cut-away in perspective showing the standard network with the housing removed.
Figure 4:
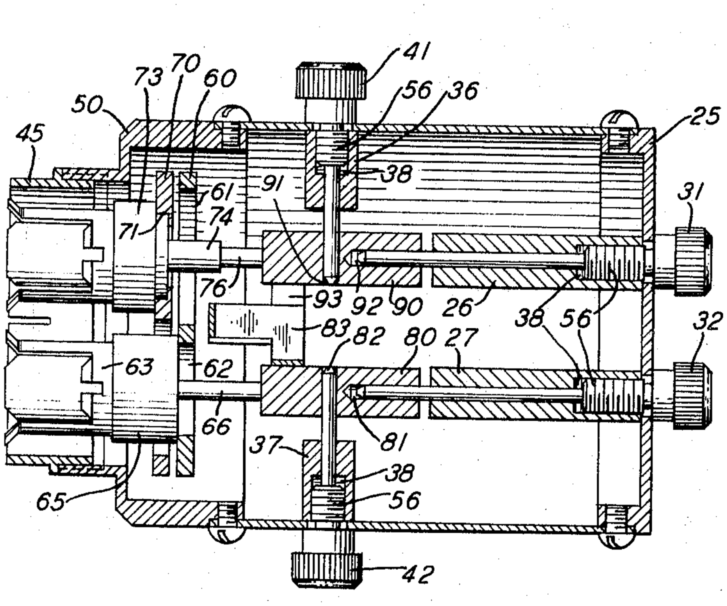
FIG. 4 is a plan view partial section of the standard.
Figure 5:
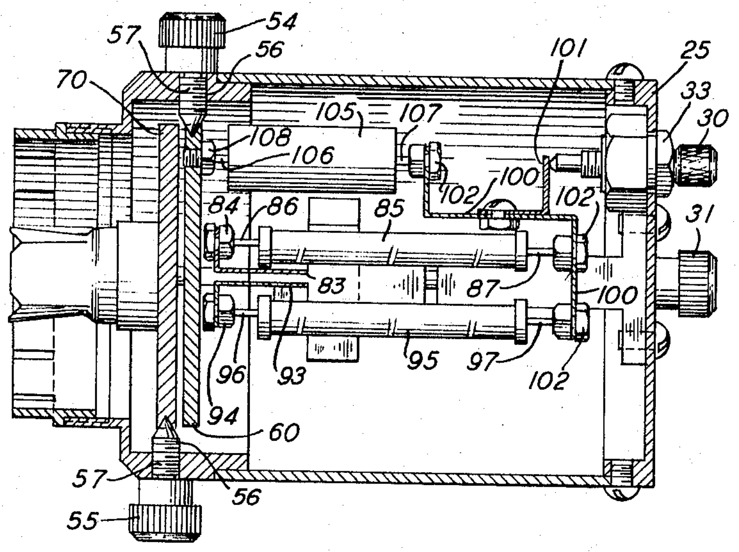
FIG. 5 is a sectional plan view showing the network.

FIGS. 3, 4 and 5 show one illustrative embodiment of the housing means, the network support means, the network connected means and the adjustment means. As shown in FIG. 3, collar support 50 secures to collar 45 which fastens to the shield of a bridge (not shown) or to mounting ring 10. The network support means includes a first and a second mounting means, termed for illustrative purposes a first disk 60 and second disk 70. Disks 60 and 70 are centrally positioned respectively within collar support 50 by support pins 54 and 55. Support pins 54 and 55 have threads 56 that engage in spaced tapped holes 57 of collar support 50. Disk 60 has first and second apertures 61 and 62. Soldered to aperture 71 of disk 70 is a first hermaphroditic connector 73 having inner element 74 and outer element 75. Soldered to aperture 62 of disk 60 and passing clear of disk 70 through aperture 72 is second hermaphroditic connector 63 having inner element 64 and outer element 65. In FIG. 4, a first terminal pin 66 having a fitting 80 mates with inner element 64 of connector 63. A second terminal pin 76 having a fitting 90 mates with the inner element 74 of connector 73.

Figure 6:
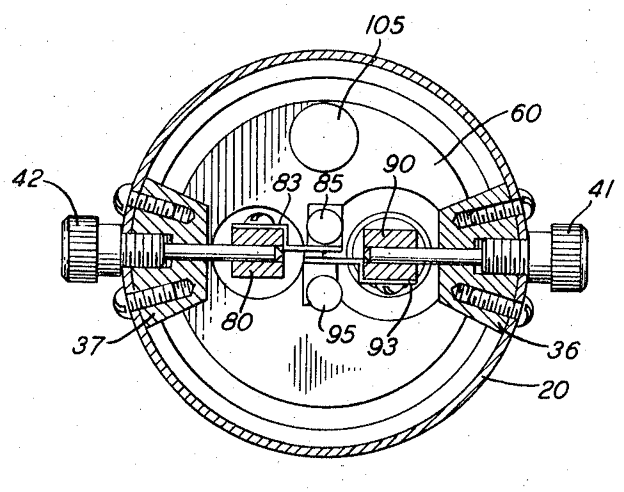
FIG. 6 is a sectional side view of the housing.

The resistor network is supported as follows. Referring to FIGS. 5 and 6, a resistor support 83 fastened to fitting 80 ties a termination assembly 84 to the lower end 86 of a first resistor 85. Another resistor support 93 fastened to fitting 90 ties termination assembly 94 to the lower end 96 of a second resistor 95. As seen in FIG. 3, each of these resistors 85 and 95 are thereby mounted generally parallel with the inner wall of housing 20. A common bus 100 is linked by termination assemblies 102 and upper ends 87 and 97, respectively, to resistors 85 and 95. Also attached to common bus 100 is shorting strap 101 that can be linked electrically to housing 20 by shorting screw 30 that, as seen in FIG. 1 screws into a threaded block 33. Bus 100 is also common to a third resistor 105 which is supported by its upper end 107 through termination assembly 102, and by its lower end 106 through a termination assembly 108 that is mounted on disk 60.

Figure 7:
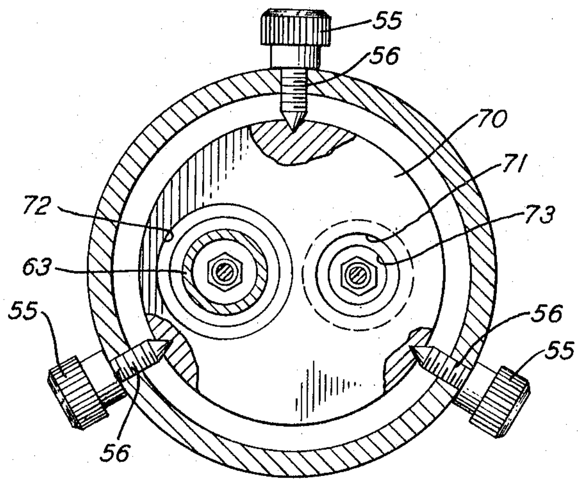
FIG. 7 is a sectional side view showing support of the disks.

In accordance with the invention, the entire resistor network, the buses, the disks and the hermaphroditic connectors can be isolated completely from the shielding consisting of housing 20, collar support 50 and collar 45; or can be rigidly supported therein by action of the several pins now to be described. Referring first to FIG. 4, anchor pins 31 and 41 are shown in position, passing into drill holes 91 and 92 of fitting 90. Pins 31 and 41 have threads 56 which engage tapped holes 38 in fixed mounting blocks 26 and 36, respectively. In similar fashion, anchor pins 32 and 42 are shown in position passing through drill holes 81 and 82, respectively, of fitting 80. Pins 32 and 42 also have threads 56 which engage tapped holes 38 in fixed mounting blocks 27 and 37, respectivly, As seen in FIGS. 5 and 7, support pins 54 and 55 hold disks 60 and 70, respectively, in position. Shorting screw 30 impinges upon shorting strap 101 to eliminate possible electrostatic charge build-up between the resistors during storage. With the several support pins positioned as described and the standard secured within its mounting ring 10, the standard may readily be stored or shipped in its case 1.

FIG. 6 shows resistance supports 83 and 93 attached respectively to fittings 80 and 90 and to resistors 85 and 95, respectively.

Figure 8:
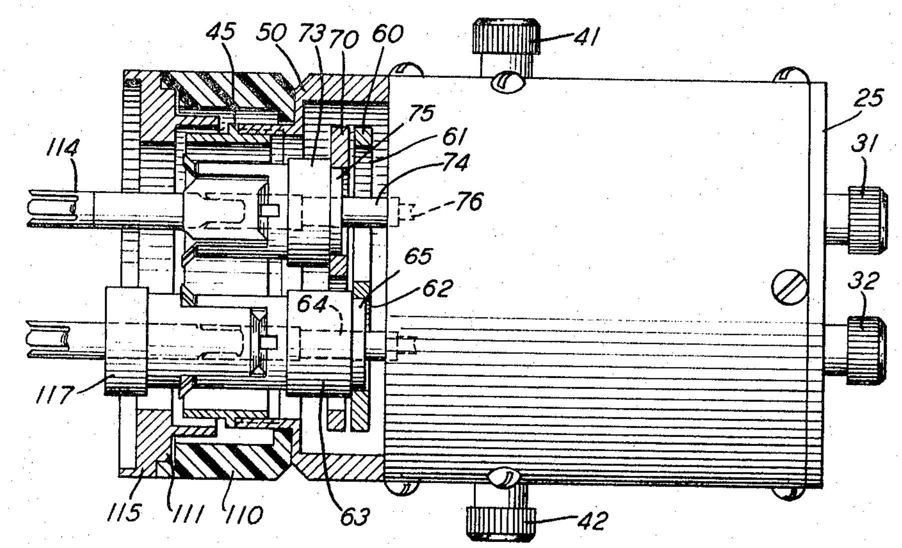
FIG. 8 is a plan view in partial section showing connector extensions and the adaptors in place.
Figure 9:
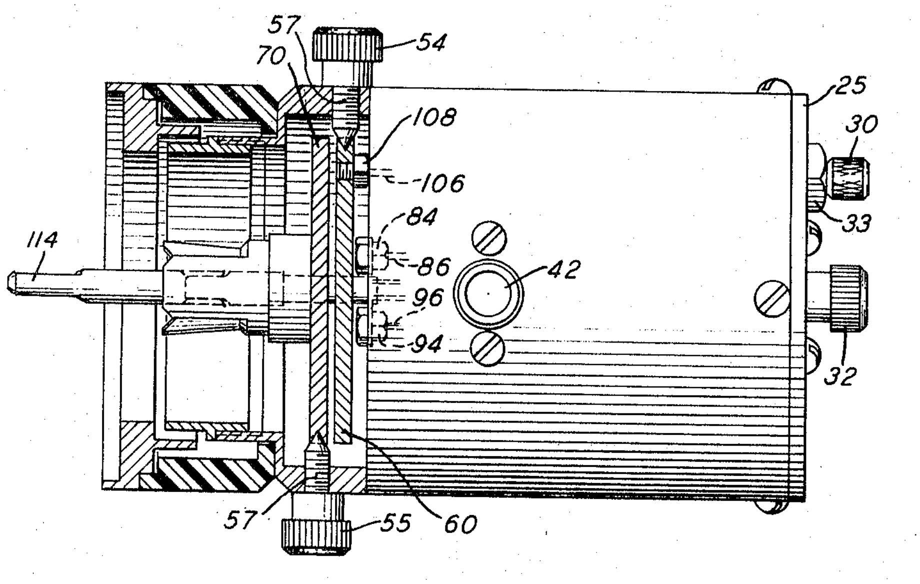
FIG. 9 is a rotated sectional plan view showing the adaptors.
Figure 10:
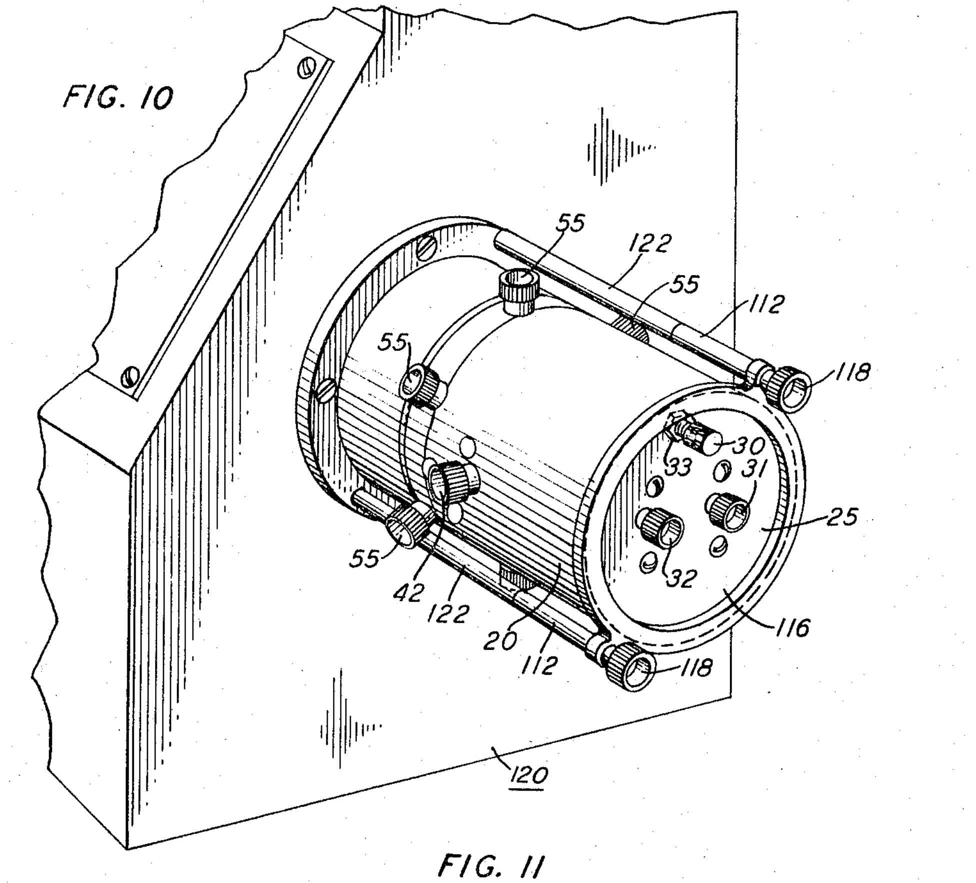
FIG. 10 shows the standard installed on a bridge.

FIGS. 8 and 9 shows additional structure necessary when the individual resistors are to be calibrated. A spacing ring 110 slips over a flanged portion of collar support 50. Shield ring 115 fits within a flanged portion 111 of ring 110. The assembly plugs into a D.-C. resistance bridge 120 as, for example, shown in FIG. 10 on which are provided hermaphroditic connectors (not shown) similar to those seen in FIG. 3. As seen in FIG. 10, a pair of threaded stand-offs 122 are exended with insulated extensions 112. These in turn connect to retainer 116 and screws 118 which bears down upon and firmly holds the standard onto the bridge.

Connectors 63 and 73 are extended by special adaptors such as inner adaptor 114 or inner-outer adaptor 117, both shown in FIG. 8, and which will be described hereinafter.

*Operation*

Figure 15:
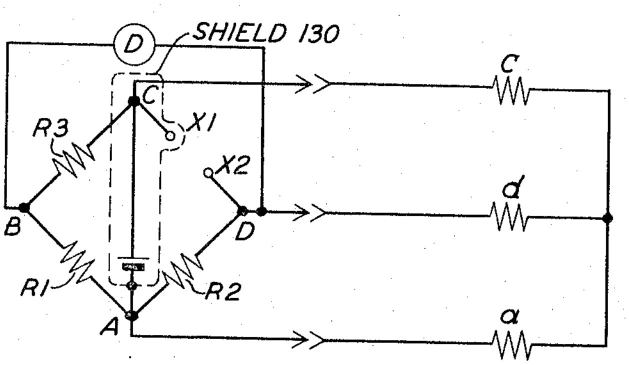
FIG. 15 is a circuit schematic showing a typical measuring bridge circuit and the Y network connected to it.

Operation of the Y standard may be more readily understood by describing its use on a typical measuring bridge. The basic circuit within the measuring bridge is essentially a Wheatstone bridge as shown in FIG. 15 and is, of course, well known. The variable resistors therein are shown as R1, R2 and R3; and the bridge corners are indicated as A, B, C and D. The usual battery is connected across A and D corners. The unknown resistance is connected between the C and D corners to the bridge terminals $X_1$ and $X_2$. A guard circuit (shown in FIG. 15 as a dotted line) surrounds the $X_1$ potential so that leakage may be returned to the A corner of the bridge in accordance with usual practice. The various elements of the Y standard are connected in various manners to specific points on the measuring bridge, and reference will be made to the above designations in the later circuit descriptions.

In accordance with the invention, the standard is used to calibrate a conductance bridge or a resistance bridge by removing the standard from mounting ring 10, and mating its connectors 63 and 73 with corresponding hermaphroditic connectors on the bridge (not shown). The description to follow is best illustrated by reference to FIGS. 4–10. With the standard connected to the bridge, support pins 54 and 55 that support disks 60 and 70, respectively, and pins 31, 32, 41 and 42 that hold fittings 80 and 90 in place are removed and replaced by short cap screws (not shown) to maintain good shielding. Shorting screw 30 is partially withdrawn. With these adjustments completed, the entire resistance network including disks 60 and 70, terminals 66 and 76, fittings 80 and 90, resistors 85, 95, 105, supports 83 and 93 and common bus 100 are rigidly suspended within the standard insulated from the housing by air and protected from all outside influences by the shielding of the housing itself; and connected electrically and mechanically to the bridge by means of the connectors 63 and 73.

When calibration of the bridge is completed, the support pins 54 and 55, the anchor pins 31, 32, 41 and 42 are replaced and the shorting screw 30 is tightened to provide support for the standard network so that it may remain suspended in place within the housing upon removal.

In accordance with the invention, the calibration of the Y network and of each individual resistor therein may be accomplished without removing the resistors from the protective housing or disturbing the network. These operations are described below.

Figure 11:
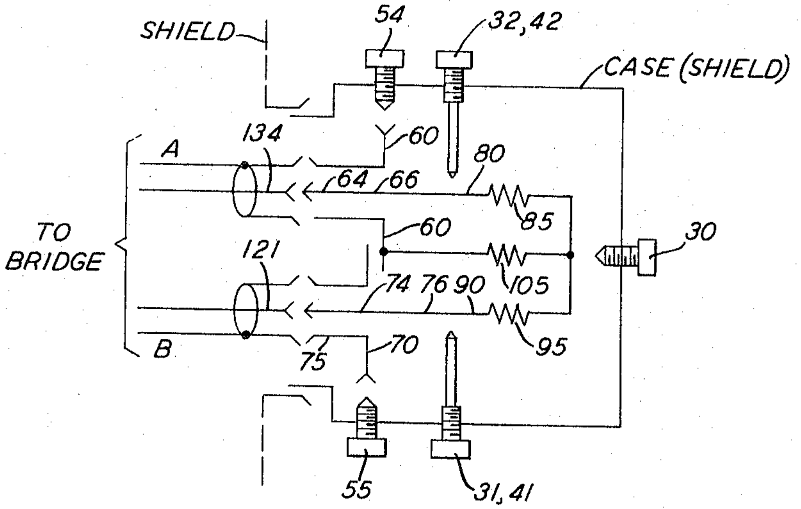
FIG. 11 is a circuit schematic showing use of the entire network on a bridge.

The standard is first made ready for these measurements by connecting spacing ring 110 and by adding shield 115 onto ring 110 as shown, for example, in FIG. 8. This isolates housing 20 from ground in order that it can become a part of the measurement circuit in accordance with the invention. Next, two inner element extensions 114 (both of the type labeled 114 in FIG. 8) are attached respectively to the inner elements 64 and 74 of the connectors 63 and 73, as shown schematically in FIG. 13. As seen in FIG. 10, two nonconductive stand-off extensions 112 are added to stand-offs 122 seen in FIG. 11, and the standard is secured to the measuring bridge with retainer 116 and thumbscrews 118.

It is necessary to employ a metal shield to cover the entire standard including its case 20 when the individual resistors are being calibrated. Such a shield is shown in FIGS. 12, 13, 14 and 15 as element 130 schematically.

It is convenient to measure first the value of the resistor 85. Accordingly, anchor pins 32 and 42 which support resistor 85, are removed. Shorting screw 30 is engaged to common bus 100. Anchor pins 31 and 41 are engaged as are the support pins 54 and 55 that support disks 60 and 70.

Figure 12:
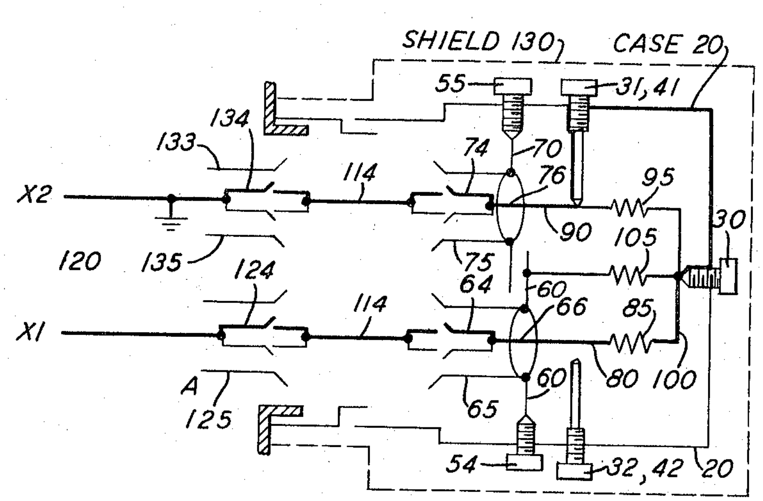
FIG. 12 is a circuit schematic showing a method of measuring the first resistor alone.

FIG. 12 shows schematically the electrical and mechanical connections that result in a circuit between the two inner elements of the hermaphroditic connectors 124 and 134 on the bridge, in which only resistor 85 is a component. Extension 114 plugs into the inner connector 124, which is the so-called "$X_1$" terminal of the bridge, and connects with inner element 64 which joins resistor 85 through terminals 66 and fitting 80. The engaging of bus 100 by shorting screw 30 connects the other side of resistor 85 electrically to case 20. Since pins 31 and 41 are inserted into fitting 90, a path is thereby provided from the one side of resistor 85 through shorting screw 30 and case 20 on through pins 31 and 41 to fitting 90, thence to second terminal 76, inner element 74 and second extension 114, and finally to inner element 134 on the bridge. A direct short across resistor 95 is provided by the path consisting of common bus 100, shorting screw 30, case 20, pins 31 and 41 and second fitting 90, removing resistor 95 from the circuit. Resistor 105 is shorted out across case 20 by the action of shorting screw 30, common bus 100, outer conductor 65, first disk 60 and support pins 54. After resistor 85 has been measured, pins 32 and 42 supporting resistor 85 are reinserted.

Figure 13:
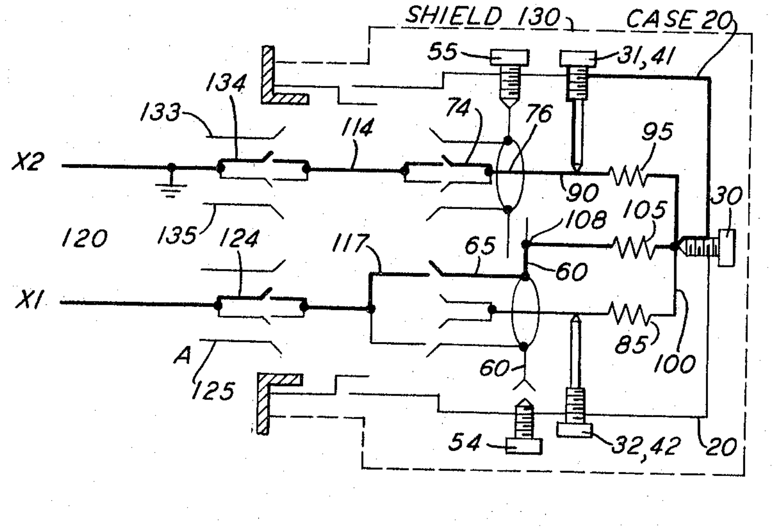
FIG. 13 is a circuit schematic showing a method of measuring the third resistor alone.

To measure resistor 105, the standard must first be removed from the bridge and extension 104 replaced by an inner-outer element adaptor 117 as shown in FIG. 13; thereafter the standard is replaced in the bridge. In order now to provide a circuit across the bridge terminals 124 and 134, in which the only component is resistor 105, the support pins 54 that support disk 60 are removed. Support pins 55 are fully inserted as are pins 31, 32, 41 and 42.

As shown in FIG. 13, the circuit from bridge inner element 124 comprises adaptor 117, outer conductor 65 disk 60, assembly 108, resistor 105, common bus 100, shorting screw 30, housing 20, pins 31 and 41, fitting 90, terminal 76, inner conductor 74, extension 114 and finally inner element 134 on the bridge. Neither resistor 85 nor resistor 95 forms part of the circuit since each is shorted out: resistor 85 by bus 100, shorting screw 30, case 20 and pin 42; and resistor 95 by bus 100, shorting screw 30, case 20 and pin 41. With measurement of resistor 105 completed the three thumbscrews 54 should be reinserted.

Figure 14:
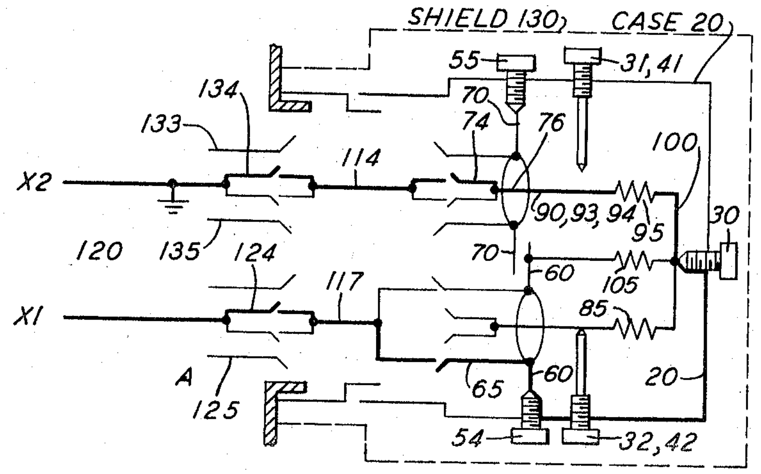
FIG. 14 is a circuit schematic showing a method of measuring the second resistor alone.

To measure resistor 95, pins 31 and 41 which support resistor 95 are removed. Support pins 55 and anchor pins 32 and 42 are engaged. FIG. 14 shows schematically the circuit diagram for this measurement and is as follows. From bridge terminal 124 adaptor 117 connects to outer element 65 which is grounded to case 20 by support pins 54. From here the path consists of case 20, shorting screw 30, common bus 100, resistor 95, termination assembly 94, resistance support 93 on fitting 90, terminal 76, inner element 74, extension 114 and finally bridge terminal 134. On completion, pins 31 and 41 are replaced.

To measure the entire Y network, extension 112, extension 114, adaptor 117, insulator 115 and spacing ring 110 are removed, and the standard re-attached to bridge 120 and secured with stand-offs 122. Shorting screw 30 is backed off from the common bus 100, but not completely removed. Pins 54 and 55 and pins 31, 41, 32 and 42 are removed and shielding screws (not shown) inserted. The foregoing is most readily visualized with the aid of FIGS. 10 and 11.

Referring back to FIG. 12, resistor 85 is supported upon block 80 which connects with terminal 66 that plugs into inner element 64. Element 64 joins with bridge terminal 124 through extension 114. Resistor 105 is mounted on disk 60 which in turn is soldered to the outer element 65 of connector 63. Element 65 contacts outer element 125 on the bridge. In addition to forming a part of the guard circuit, element 125 is connected within the bridge circuit itself. Resistor 95 is connected to fitting 90 mounted on terminal 76 which contacts inner element 74 of connector 73. Element 74 contacts element 134 which is the second terminal of the bridge circuit.

When the measurement of the Y network has been made and the circuit deactivated, support pins 54 and 55 and anchor pins 31, 32, 41 and 42 are all reinserted to provide support for the network elements, and the entire standard is removed and replaced in its mounting ring and finally its storage case 1.

Figure 16:
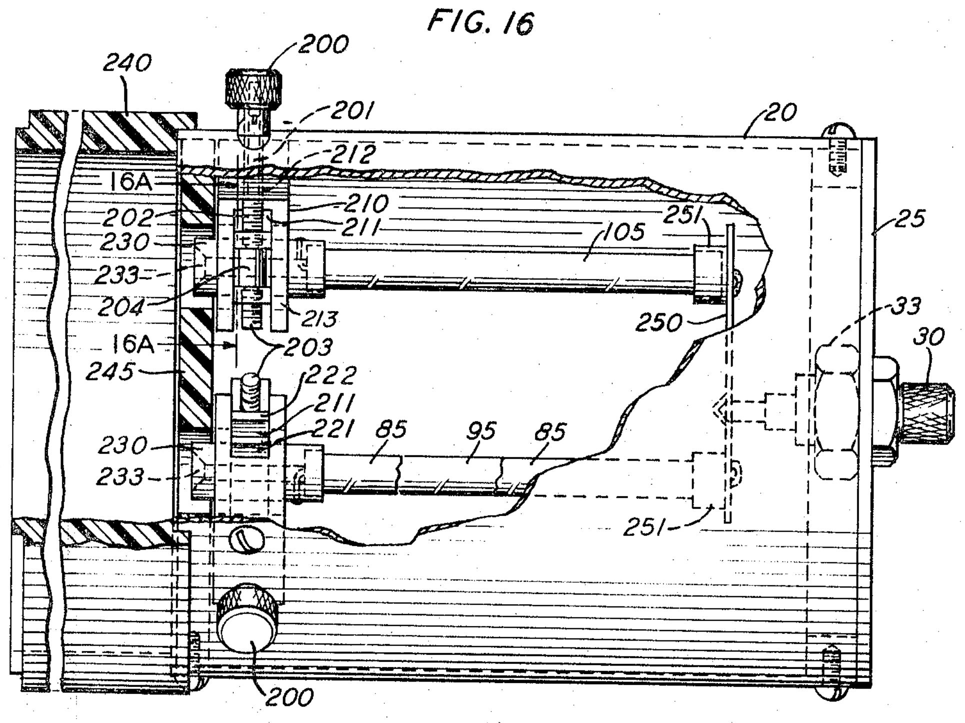
FIG. 16 is a sectional view showing an alternative support.
Figures 16A, 17:
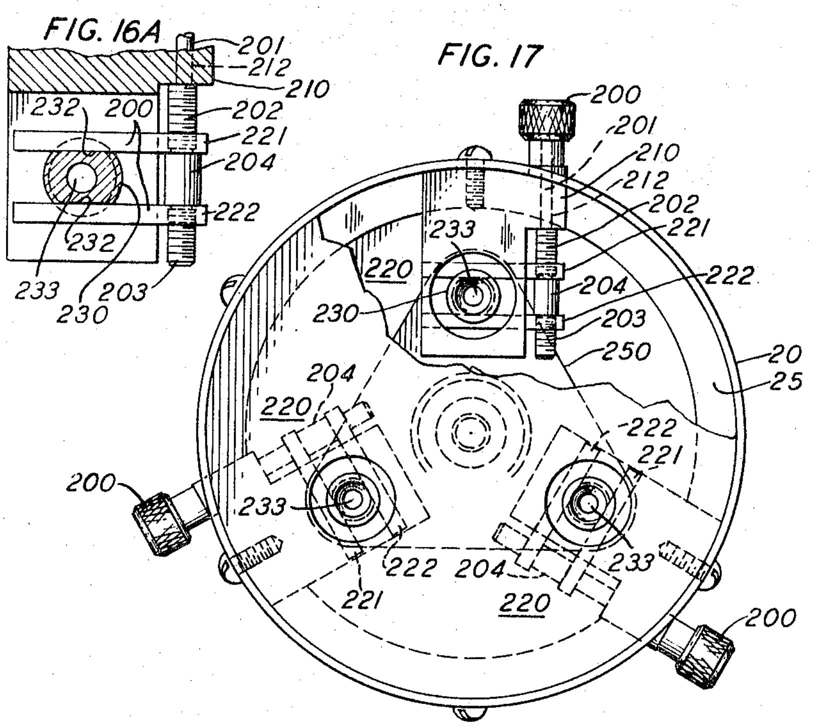
FIG. 16A is an enlarged fragmentary view of the clamp member shown in FIG. 16.
FIG. 17 is a plan view showing an alternative support detail.

An alternative method for rigidly supporting the network within the housing and for withdrawing the support may be desirable in some instances. As shown in FIGS. 16, 16A, and 17, resistors 85, 95, and 105 are located in housing 20, supported at the top by common bus 250 through caps 251 that grasp each resistor. End cap 25 again includes shorting screw 30 that screws into threaded block 33 and contacts or releases bus 250. Each resistor at its other end attaches to a connector 230, preferably by its pig-tail lead that attaches to the outer surface of the connector. Each connector 230 may be generally cylindrical as shown and has parallel grooves 232 and a female end 233. Three restraining mountings 210 each having a slot 211, guide hole 212 and clearance hole 213 are attached in symmetrical spacing around the inside of housing 20. In each mounting 210, a thumbscrew 200 having a shaft portion 201 is guided for rotation in hole 212. Shaft portion 201 includes a series of right-hand threads 202 and left-hand threads 203 separated by a shoulder 204. Jaw pair 220, having an upper jaw 221 and lower jaw 222, are threadedly attached, respectively, to the right-hand and left-hand threads of thumbscrew 200 and are guided for travel within slot 211 of mounting 210. Each connector 230 is located within the respective hole 213 in such fashion that its parallel grooves 232 may be grasped by action of its jaw pair 220 upon tightening of the thumbscrew 200. Each connector 230 lines up with a corresponding one of the male connectors (not shown) on the measuring bridge in a manner to be described later. A protective plate 245 is fastened in place at the lower end of housing 20 to guard the network from damage.

Figure 18:
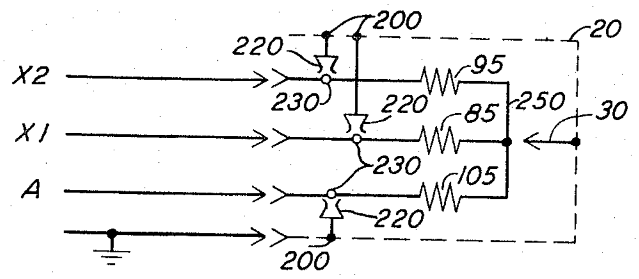
FIG. 18 is a circuit schematic showing a method of measuring the complete Y standard, using alternative support.

The operation of the alternative embodiment of the invention in conjunction with the measuring bridge earlier described and shown in FIG. 15 is as follows. The standard is connected to the three male bridge terminals as is shown schematically in FIG. 18 and each of the three thumbscrews 200 are backed off, opening each jaw pair 220 away from its corresponding connector 230. Shorting screw 30 is partially withdrawn. With these adjustments completed, the entire resistance network including bus 250 and connectors 230 are rigidly suspended within the standard, insulated from housing 20 by air and electrostatically protected by the shielding effect of the housing; and is connected electrically and mechanically to the bridge by means of the three connectors 230.

When calibration of the bridge is completed, the three thumbscrews 200 are tightened causing each jaw pair 220 to again grasp its corresponding connector 230 thereby to support the standard network so that it is held in place within the housing and may thereby be removed from the bridge. Shorting screw 30 is tightened down on bus 250.

Measurement of each individual resistor may be accomplished in the alternative embodiment as described below.

Figure 19:
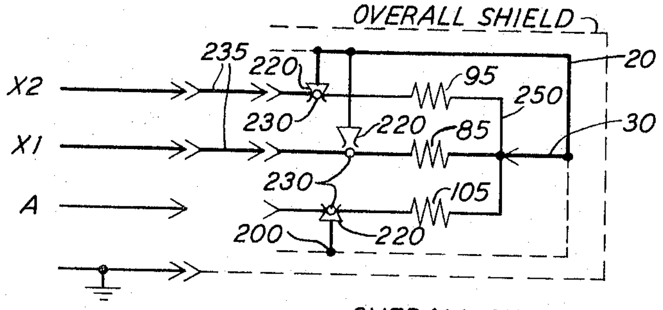
FIG. 19 is a circuit schematic showing a method of measuring a first resistor alone, using alternative support.

To measure the individual resistors the standard is made ready by connecting insulator 240 to housing 20, to isolate housing 20 from ground so that it can be used as a part of the measuring circuit pursuant to the invention. Referring to FIG. 19, extensions 235, shown schematically, are plugged into $X_1$ and $X_2$ terminals to connect them with resistors 85 and 95, respectively. To measure resistor 85 the thumbscrew 200 that supports resistor 85 is backed off withdrawing the jaw pair 220 from the connector 230. Shorting screw 30 is tightened down. There is no connection between resistor 105 and the A corner of the bridge. Resistors 105 and 95 are both supported in place. With these connections made it is seen that resistor 85 is the sole element across the $X_1$, $X_2$ terminals and may be measured.

Figure 20:
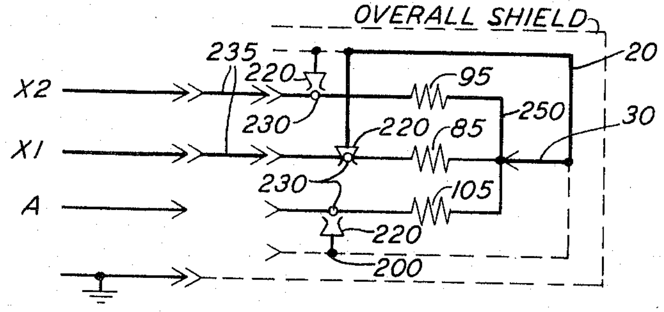
FIG. 20 is a circuit schematic showing a method of measuring a second resistor alone, using alternative support.

As best seen in FIG. 20, to measure resistor 95, its thumbscrew 200 is backed off withdrawing the jaw pair 220 from the connector 230. Resistors 85 and 105 are supported in place by the gripping action of their respective jaw pairs 220, actuated by their thumbscrews 200. Resistor 105 is not connected to any terminal. With these connections, resistor 95 is presented as the sole component across the $X_1$, $X_2$ terminals and may be measured.

Figure 21:
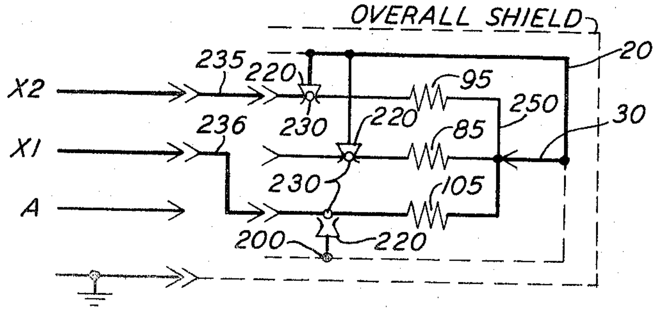
FIG. 21 is a circuit schematic showing a method of measuring a third resistor alone, using alternative support.

To measure resistor 105, the extension 235 that connected the $X_1$ terminal with resistor 85 is removed and a special adaptor 236, such as shown schematically in FIG. 21, is employed to connect the $X_1$ terminal with resistor 105. The support for resistor 105 is withdrawn, while the supports for resistors 85 and 95 are left in place. Resistor 85 is not connected to any terminal. Shorting screw 30 is also tightened down. With these connections made, resistor 105 is presented across the $X_1$, $X_2$ terminals as the sole component and may be measured.

All of the operations described apply equally well to a resistance bridge as to a conductance bridge.

Persons skilled in the art may make changes in the arrangements described and it is to be understood that the embodiments shown and described are merely illustrative of the principles of the invention and are not to be construed in a limiting sense.

What is claimed is:

1. Apparatus for calibrating an electrical bridge comprising, in combination, a plurality of electrical resistor elements forming a Y network, housing means for enclosing said network, support means for mounting said network in said housing, said support means including means for connecting said network electrically and mechanically to a bridge connection, adjustment means operable from outside said housing means for fixedly holding said support means within said housing and for releasing said support means when said connecting means is connected to said bridge connection during calibration thereby to isolate electrically and mechanically said network from said housing means, and means including said adjustment means for selectively connecting and disconnecting each of said elements from said network whereby each successive element is connected individually to said bridge.

2. Apparatus in accordance with claim 1 wherein said support means includes first and second mounting means, said connecting means includes first and second hermaphroditic connectors each having an inner and an outer element that connect respectively with corresponding inner and outer elements of a third and fourth hermaphroditic connector comprising said bridge connection, each of said first and second hermaphroditic connectors being affixed by its outer element respectively to said first and second mounting means, and said adjustment means includes a first and a second plurality of retractable support pins which engage and disengage said first and second mounting means respectively thereby to hold said support means during storage and plug-in and to release said support means during calibration.

3. Apparatus in accordance with claim 2 wherein said support means further includes a first and a second terminal pin integral respectively with said inner elements of said first and second connectors, each of said terminal pins having at least one recess, and said adjustment means further includes a first and a second set of retractable anchor pins, each set comprising at least one said pin, whereby said first and second pin sets engage and disengage respectively said first and second terminal pins thereby to hold said terminal pins during storage and plug-in and to release said terminal pins during calibration.

4. Apparatus in accordance with claim 3 wherein said Y network comprises first, second and third resistor elements each having first and second ends, said first ends being connected to form a common point, said second end of said first element being connected to said first termnal pin, said second end of said second element being connected to said second terminal pin and said second end of said third element being connected to said second mounting means whereby on engagement of said first and said second plurality of retractable support pins and of said first and said second sets of retractable anchor pins said network is held rigidly and upon disengagement of the aforesaid support pins and anchor pins during calibration said network is isolated electrically and mechanically from said housing.

5. Apparatus in accordance with claim 4 wherein said selective means includes means for connecting and disconnecting electrically said housing means and said network at said common point thereby to short out each said element and prevent electrostatic charge build-up during storage of said network.

6. Apparatus in accordance with claim 4 further including means for insulating said housing means from said bridge and wherein said selective means includes shorting means for connecting and disconnecting electrically said housing means and said network at said common point whereby when said support pins are engaged in said mounting means, said first set of anchor pins is disengaged from said first terminal pin, said second set of anchor pins is engaged in said second terminal pin and said shorting means are connecting said housing means and said network common point, an electrical path including said housing means is established across said inner members of said third and fourth hermaphroditic connectors of said bridge connection in which the sole component is said first element.

7. Apparatus in accordance with claim 4 further including means for insulating said housing means from said bridge, adaptor means for connecting said outer element of said first hermaphroditic connector with said inner element of said third hermaphroditic connector located on said bridge and wherein said selective means includes shorting means for connecting and disconnecting electrically said housing means and said network at said common point whereby when said support pins are engaged in said mounting means, said first set of anchor pins is engaged to said first terminal pin, said second set of anchor pins is disengaged from said second terminal pin and said shorting means are connecting said housing means and said network common point, an electrical path including said housing means is established across said inner members of said third and fourth hermaphroditic connectors of said bridge connection in which the sole component is said second component.

8. Apparatus in accordance with claim 1 wherein said support means comprises means affixed to one end of each said element and having a gripping surface, and said connecting means includes a terminal on said support means for mating each said element to a corresponding terminal on said bridge, and said adjustment means includes rotatable means for alternately gripping and releasing said affixed means at said gripping surface thereby to hold said network during storage and plug-in and to release said network during calibration.

9. Apparatus in accordance with claim 8 wherein each said adjustment means includes a pair of jaws and means operable from outside said housing means for opening and closing said jaws, whereby said support means for each said element in said network is selectively gripped and released.

10. Apparatus in accordance with claim 9 wherein said network comprises first, second and third elements each having first and second ends, said first ends being connected to form a common point and said second end of each said element being anchored in a respective one of said support means, and said adjustable means includes first, second and third thumbscrews secured for rotatable motion and operable from outside said housing, each said thumbscrew having a shaft within said housing, each said shaft including a first portion having right-hand threads and a second portion having left-hand threads, each said jaw pair being threadedly engaged to said first and second threaded portions of said shaft whereby each of said first, second and third elements is selectively gripped and released, respectively, by rotation of said first, second and third thumbscrews.

11. Apparatus in accordance with claim 10 wherein said selective means includes means for connecting and disconnecting electrically said housing means and said network at said common point thereby to short-out each said element and prevent electrostatic charge build-up during storage of said network.

References Cited by the Examiner

UNITED STATES PATENTS

| | | | |
|---|---|---|---|
| 1,146,592 | 7/1915 | Northrup | 338—77 X |
| 2,484,030 | 10/1949 | Hastings et al. | |

References Cited by the Applicant

AIEE Transactions "A Precision, Guarded Resistance Measuring Facility," September 1958, pp. 471–475.

JOHN F. COUCH, *Primary Examiner.*

A. D. PELLINEN, *Assistant Examiner.*